June 26, 1956     L. DE WITTE     2,752,562
DETECTION OF WATER IN CRUDE OIL FLOW
Filed Feb. 2, 1955
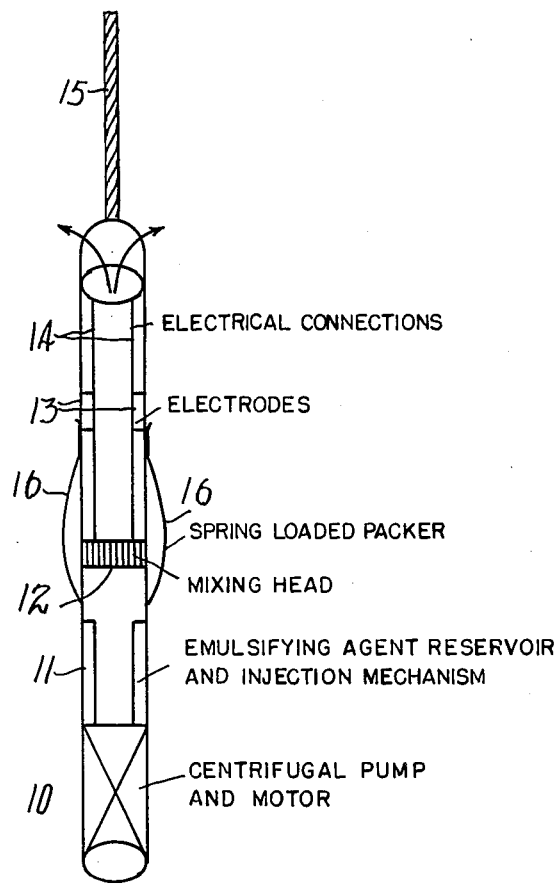
INVENTOR.
LEENDERT de WITTE
BY
*Floyd Trimble*
ATTORNEY

United States Patent Office 2,752,562
Patented June 26, 1956

2,752,562

DETECTION OF WATER IN CRUDE OIL FLOW

Leendert De Witte, Ponca City, Okla., assignor to Continental Oil Company, Ponca City, Okla., a corporation of Delaware Application February 2, 1955, Serial No. 485,654

7 Claims. (Cl. 324—2)

This invention relates as indicated to the detection of water contamination in crude oil flow and, more particularly, to an improved method for determining the water presence by electrical capacity measurements.

It is a well known procedure to form an electrical capacitance in a fluid stream wherein the fluid acts as the dielectric and to detect changes in the capacity as an indication of changes in the character of the stream. Variations producing changes in the dielectric constant of the stream, for example, the replacement of one fluid with another or the presence of contaminants may thus be observed, and if desired, quantitative, as well as qualitative analysis can be made.

This prior practice, however, has not successfully been applied to accurate detection and measurement of water in an oil stream due to the fact that the dielectric constant of such stream is not a unique function of the dielectric constant of the oil and of the water and the percentage of water present, but varies with the way in which the water is dispersed in the oil. Accordingly, a reading obtained when a given percentage of water flows between the capacitance-forming electrodes as a continuous stream is different from that obtained when the same percentage of water is dispersed as relatively large droplets. Still different readings occur when the water is present as a water-in-oil emulsion and when the oil is present as an oil-in-water emulsion.

Because of this inherent possibility of error, the capacity measuring systems previously used have not been adapted to the locating of points of water entry in a well producing both water and oil. Unless such points are accurately determined, remedial work to stop the water entry is usually expensive and ineffective.

It is a primary object of my invention to provide a novel capacity method for determining water presence in oil flow which affords uniformity of the physical relationship of the water and oil at the time the capacitance thereof is measured, whereby the readings will be substantially unaffected by differences in the distribution of the two in the stream in advance of the region of measurement.

Another object is to provide such a method for accurate measurement of the dielectric constant of fluid produced from the bore face of a well as a continuous survey over all the productive intervals in the well.

Another object of my invention is the detection of leaks in oil well casings which gives rise to water entry into a production stream of oil.

Other objects and advantages of the invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

The single figure of the drawing is a schematic illustration of a device adapted for the detection of water entry in an oil well in accordance with the present invention.

Broadly stated, my invention comprises converting the water and oil flow into a temporarily stable emulsion, thereby to achieve the desired uniformity of dispersion which permits accurate measurement of the capacity. Where the stream is predominantly oil, with less than fifty percent watercut, a water-in-oil emulsion is produced, and where the total fluid includes greater than fifty percent watercut, a temporarily stable oil-in-water emulsion is formed.

Referring now to the drawing in detail, the device there shown in intended for use in the application of the new method to measurement of the dielectric constant of fluid produced from the bore face of a well, which is producing both oil and water, for the purpose of accurately ascertaining the points of water entry into the well. This device is of tubular form adapted to have the well fluid passed therethrough and comprises, at the lower end, a centrifugal pump and motor unit 10, a superimposed reservoir 11 adapted to contain a quantity of an emulsifying agent and equipped with suitable means for injecting the same continuously into the fluid stream, and a mixing head 12 operative to agitate the stream subsequent to the injection to produce the desired emulsion of the oil and water.

If the natural flow of the fluid is rapid enough to effect mixing by the head 12, the motor-driven centrifugal pump may be omitted. Spaced electrodes 13 are carried by the device above the mixing head and electrical connectors, indicated at 14, are provided for connection of the electrodes to a suitable instrument operative to measure, and, if desired, to record, the capacity between the electrodes and hence indicate the dielectric constant of the fluid stream. Such instrument may be of conventional bridge or tuned circuit type, or of other known type.

This logging device is lowered into the well by means of a cable 15 and is equipped with spring-loaded rubber packers 16 on the outer wall thereof to prevent any appreciable bypassing of the device by the produced fluid stream. In flowing wells, the device is simply lowered into the well, the cable being moved through a lubricator at the wellhead. In pumping wells, the tubing is first pulled from the well, the logging device lowered therein, and the tubing then replaced. The tubing is lowered so that the producing pump is located some distance above the productive intervals and the logging device is free to move in the annular space between the casing and tubing. The producing intervals are then surveyed from the bottom of the well upward by slowly pulling up the device. During the survey, the well is pumped at or near its usual rate of production.

At the points of water entry into the well, the dielectric constant of the stream changes, and such changes are accurately reflected by the resultant variation in the measured capacity. Thus, the points are reliably ascertained and effective measures may be taken to stop the flow of water.

The particular emulsifying agent used, as indicated earlier, will be selected to produce the desired type of emulsion dependent upon whether the flow is predominantly oil or water. Some examples of such agents, grouped according to the type of emulsion to be formed therewith, are as follows:

*1.—Agents for water in oil emulsions*

Fatty acid esters of lower polyvalent alcohols such as:
    Diethyleneglycol monooleate
    Diethyleneglycol monostearate
Other compounds:
    Quarternary ammonium halides Diethylamino ethyloleylamide acetate
Diethylamino ethyloleylamide hydrochloride
Diethylamino ethyloleylamide metho sulfate
Sodium alkyl benzene sulfonate

*II.—Agents for oil in water emulsions* a. Aliphatic sulfonates such as:
   Dioctyl sodium sulfosuccinate
b. Sulfuric acid esters of long chained alcohols such as:
   Sodium lauryl sulfate
   Sodium oleyl sulfate
   Sodium sulfate or 2-ethyl hexanol
c. Primary, secondary, or tertiary amino compounds and their fatty acid soaps (amino soaps):
   2-amino-1-butano
   Potassium oleate
   Potassium palmitate While the illustrated apparatus is designed for oil well survey, it will be seen that my new method may be used to advantage in other systems wherein water contamination of oil flow is to be determined. The basic operation, that is, the production of an emulsion, provides a uniform standard for measurement, by means of which it is possible not only to locate accurately the sources of watercut, but also to ascertain the amount of contamination.

Other modes of applying the principle of the invention may be employed, change being made as regards the details described, provided the features stated in any of the following claims, or the equivalent of such, be employed.

I therefore particularly point out and distinctly claim as my invention:

1. In the testing of an oil stream known to contain water, the steps of forming a substantially uniform emulsion of the oil and water at a predetermined point in the flow thereof, and measuring the electrical capacity of such emulsion.

2. In the testing of an oil stream known to contain water, the steps of agitating the stream, injecting an emulsifying agent therein to form a temporarily stable emulsion of the oil and water, and measuring the electrical capacity of such emulsion.

3. In the testing of a stream containing major and minor portions of oil and water, the steps of agitating the stream, injecting an emulsifying agent therein of a type to produce an emulsion of such minor portion in such major portion, and measuring the electrical capacity of such emulsion.

4. The method of detecting points of water entry in a producing oil well, which comprises the steps of converting the fluid stream into a temporarily stable oil and water emulsion progressively over the productive intervals of the well, and measuring the electrical capacity of the thus converted portions of the stream.

5. The method of detecting points of water entry in a producing oil well, which comprises the steps of surveying increments of the fluid stream in the well with capacitance-forming electrodes, emulsifying the stream increments immediately in advance of such electrodes, and measuring the dielectric constant of the emulsified fluid between the electrodes.

6. The method of detecting points of water entry in a producing well, which comprises the steps of surveying the productive intervals of the well with capacitance-forming electrodes, adding a small amount of an emulsifying agent to the fluid stream and mixing the same in advance of such electrodes, thereby to convert the stream portion between the electrodes to a temporarily stable oil and water emulsion, and measuring the dielectric constant of the thus emulsified stream.

7. The method of logging a well producing major and minor portions of oil and water to detect the points of water entry, which comprises the steps of surveying the productive intervals of the well with capacitance-forming electrodes, agitating the produced fluid stream immediately in advance of such electrodes, adding to the agitated stream a small amount of an emulsifying agent of a type to produce a temporary stable emulsion of such minor portion in such major portion, and measuring the dielectric constant of the thus produced emulsion by means of such electrodes.

References Cited in the file of this patent

UNITED STATES PATENTS

| 1,865,847 | Ennis | July 5, 1932 |
| 2,218,155 | Rusler et al. | Oct. 15, 1940 |
| 2,349,992 | Schrader | May 30, 1944 |
| 2,377,501 | Kinley | June 5, 1945 |
| 2,624,782 | Lowson | Jan. 6, 1953 |

OTHER REFERENCES

"Electrical Engineering," May 1955, p. 416.